Jan. 10, 1967  W. R. CLOUDY  3,296,812
FOOD FREEZER AND ACCELERATED FREEZING PROCESS
Filed March 1, 1965  4 Sheets-Sheet 1

INVENTOR.
WESTLEY R. CLOUDY
BY
Robert W. Beach
ATTORNEY

Jan. 10, 1967   W. R. CLOUDY   3,296,812
FOOD FREEZER AND ACCELERATED FREEZING PROCESS
Filed March 1, 1965   4 Sheets-Sheet 2

INVENTOR
WESTLEY R. CLOUDY
BY
Robert W. Beach
ATTORNEY

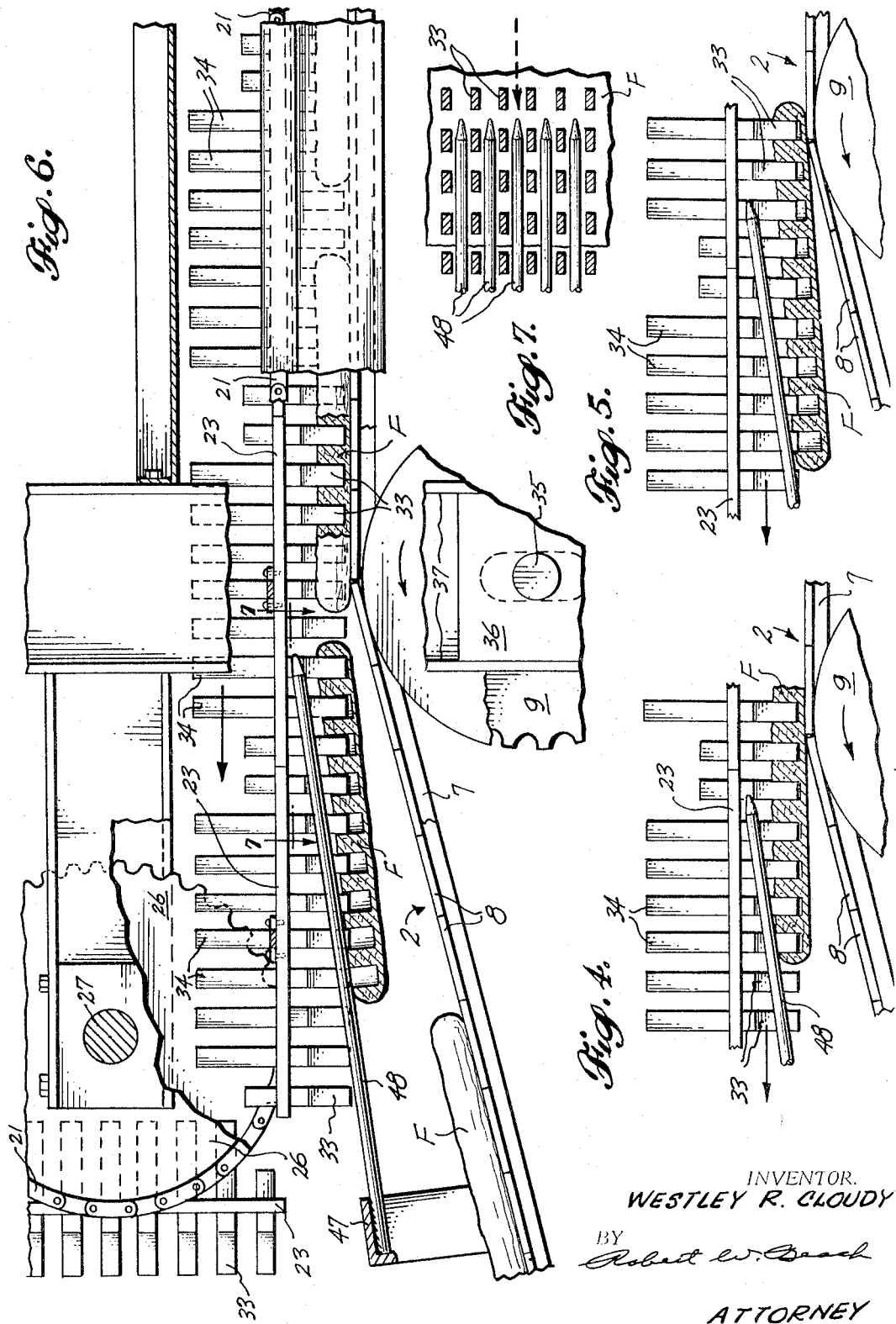

Jan. 10, 1967 W. R. CLOUDY 3,296,812
FOOD FREEZER AND ACCELERATED FREEZING PROCESS
Filed March 1, 1965 4 Sheets-Sheet 4
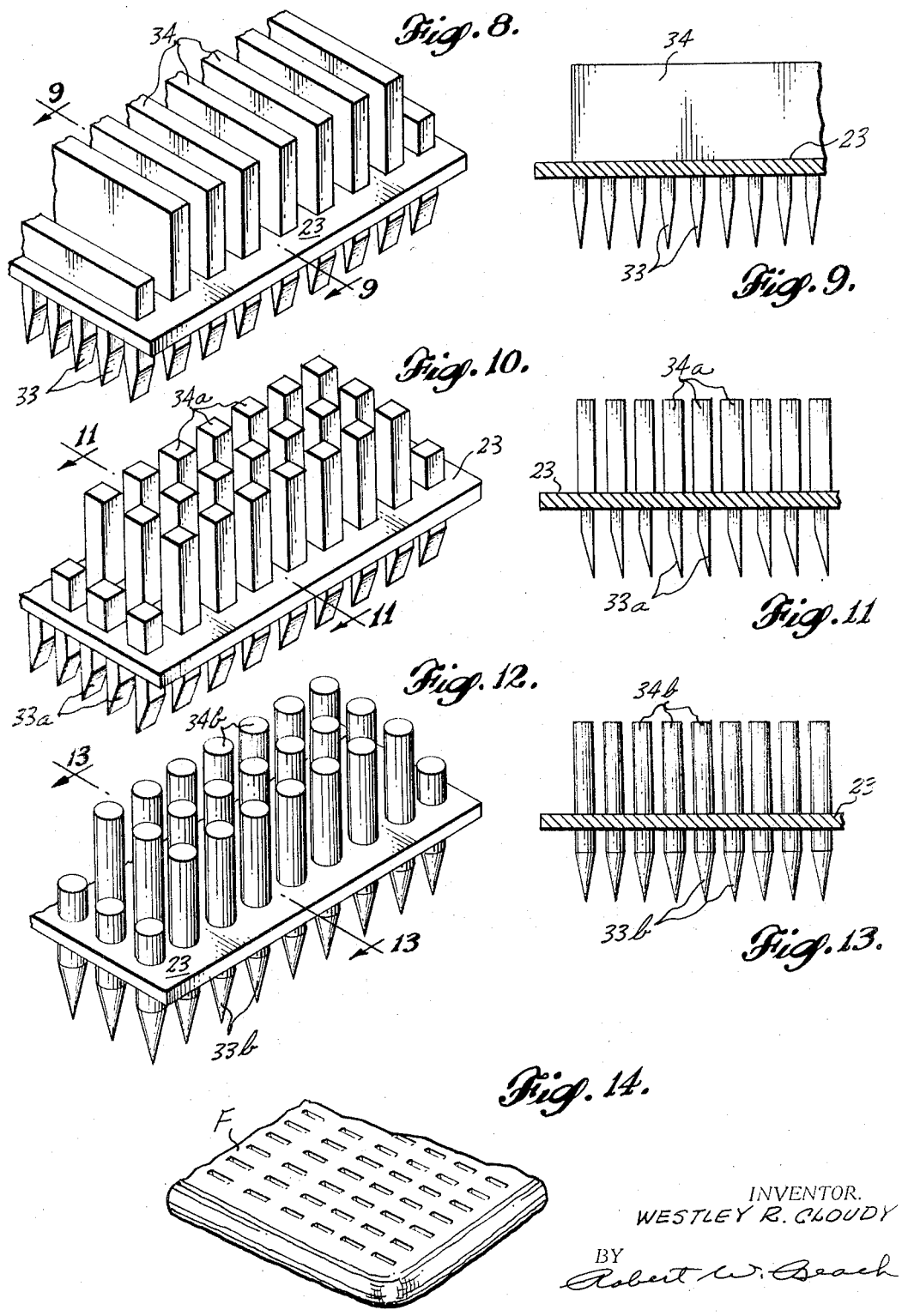
INVENTOR.
WESTLEY R. CLOUDY
BY
Robert W. Beach
ATTORNEY United States Patent Office 3,296,812
Patented Jan. 10, 1967

3,296,812
FOOD FREEZER AND ACCELERATED
FREEZING PROCESS
Westley R. Cloudy, Edmonds, Wash., assignor to Lewis Refrigeration Co., Woodinville, Wash., a corporation of Washington
Filed Mar. 1, 1965, Ser. No. 435,825
7 Claims. (Cl. 62—63)

The present invention relates to a freezer for freezing slabs of food products and to a process for freezing such products quickly and uniformly in a manner to minimize dehydration of such products and consequent freezer burn.

Particularly in the freezing of meat products, such as meat slabs, it has been a problem to prevent freezer burn resulting from dehydration and surface evaporation of moisture from the product which produces an unappetizing appearance of the meat. This problem is particularly pronounced in slab meat products such as ground beef or hamburger patties and minute steaks. In modern merchandising such meat products are displayed in open-topped refrigerated cabinets from which intending purchasers can select products. Sales appeal of such products is reduced if the surface is of gray appearance as compared to such products in which the reddish color of fresh meat is preserved even though the product is frozen.

While the occurrence of freezer burn is particularly detrimental for meat products, as mentioned above, it can occur in other food products and, even if such other products are not impaired in appearance, freezing can dehydrate the product so that when it is cooked its flavor and texture are much less desirable than in corresponding fresh products.

It is a principal object of the present invention, therefore, to provide an accelerated and controlled process for freezing food product slabs so as to minimize dehydration of the products and especially to avoid the occurrence of freezer burn in meat products.

A further object is to provide a freezer capable of performing such process quickly and economically and with a minimum of labor.

A further object is to provide such a process and freezing apparatus which can be used for processing different sizes and particularly different thicknesses of food product slabs.

Another object is to provide such a freezing process which will not impair the appearance of the product, but may actually improve its appearance and enable it to be cooked to better advantage.

It is also an object to provide freezing apparatus for performing such process which is relatively inexpensive to manufacture and which can be operated efficiently for extended periods of time.

More specifically, it is an object to freeze food product slabs by removing heat simultaneously from virtually the entire thickness of the food product slab so as both to accelerate the freezing procedure and to accomplish the freezing of the slab substantially uniformly both over its entire area and throughout its thickness.

The foregoing objects can be accomplished by piercing a food product slab with a set of heat-conductive tines having sharpened tips which extract heat uniformly and rapidly from the slab. Such heat is conducted to radiator members such as posts or plates from which heat is dissipated to cooling fluid such as air blown over them. The tines of the set are arranged so as to produce on the slab an incised surface in which the pattern of incisions is arranged in a pleasing and preferably familiar manner corresponding, for example, to some extent to the impression made on steaks by some perforating types of tenderizing machines. The freezer preferably includes two synchronized endless belts, one of which is a conveyor for transporting the slabs through the freezer and the other of which carries a set of tines which are pressed into the food slabs and which have associated with them the radiators from which the heat removed from the slabs is dissipated. At the completion of the freezing operation, the slabs are stripped from the tines by prongs of a stripping fork interdigitated with the slab-piercing tines.

FIGURE 4 is an enlarged fragmentary longitudinal vertical section through a portion of the freezer showing parts in one relationship, FIGURE 5 is a similar view with the parts in a different relationship, and FIGURE 6 is a similar view of a larger portion of the freezer with parts in still a different relationship.

FIGURE 7 is a fragmentary substantially horizontal section on line 7—7 of FIGURE 6.

FIGURE 8 is a top perspective of a portion of the piercing and radiator portion of the freezer and FIGURE 9 is a fragmentary vertical transverse section through a portion of such structure on line 9—9 of FIGURE 8.

FIGURE 10 is a top perspective of an alternative form of the piercing and radiator portion of the freezer and FIGURE 11 is a fragmentary vertical transverse section through a portion of such structure on line 11—11 of FIGURE 10.

FIGURE 12 is a top perspective of still a different form of the piercing and radiator portion of the freezer and FIGURE 13 is a fragmentary vertical transverse section through a portion of such structure on line 13—13 of FIGURE 12.

Figure 15:
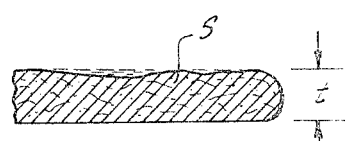
Figure 16:
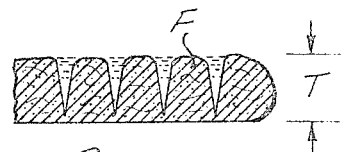

FIGURE 14 is a top perspective of a portion of a food product slab processed in the frezer of the present invention showing the pattern of incisions on a surface of such slab, FIGURE 15 is a vertical section through a portion of such a food product slab if cooked without being processed in the present freezer, and FIGURE 16 is a similar view of a portion of a food product slab during cooking which has been processed in the present freezer.

Figure 1:
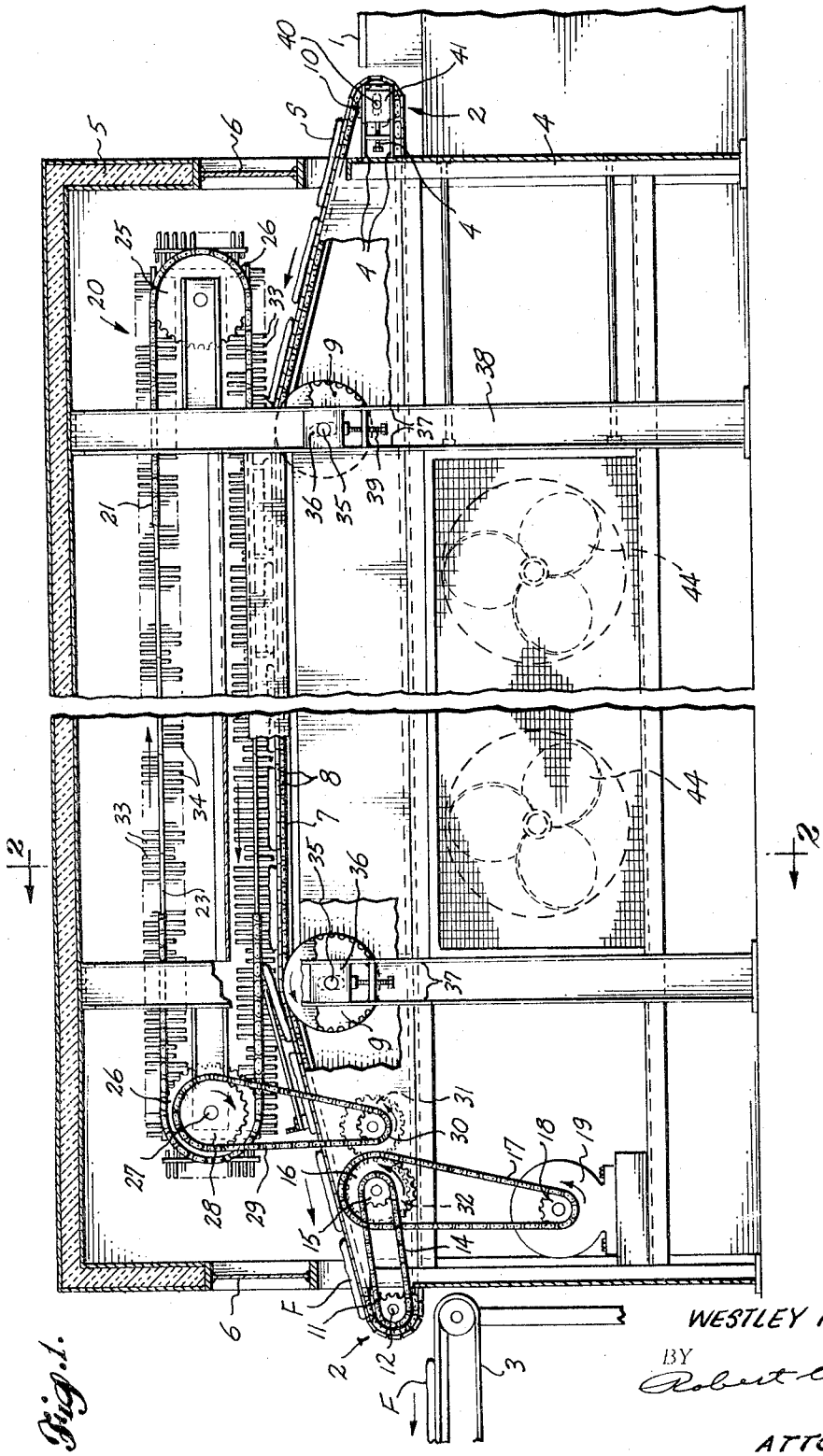
FIGURE 1 is a longitudinal vertical section through the freezer, with parts broken away.
Figure 2:
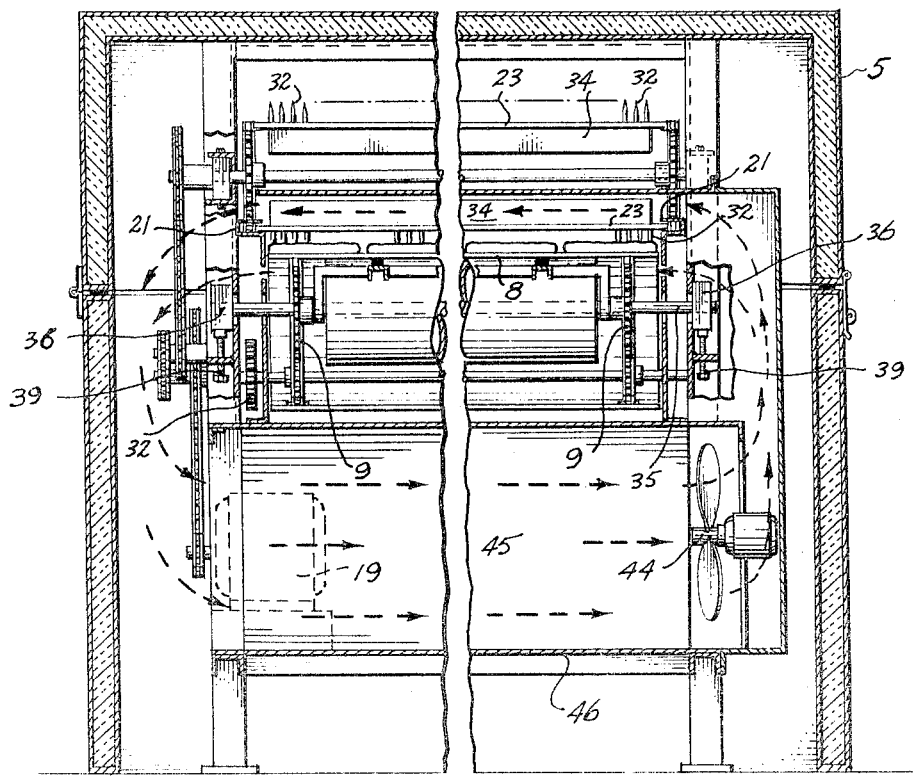
FIGURE 2 is a transverse vertical section through the freezer on line 2—2 of FIGURE 1.

While the process to which the present invention pertains can be used effectively and beneficially for freezing slabs of food products of different types, such process is most useful for freezing meat slabs, whether of the ground meat patty type or of the steak type. Such a slab has a thickness less than a quarter of each of its width and length as shown in FIGURES 1 and 2, to provide two opposite principal surfaces. In the case of a steak, the process serves the dual purpose of freezing the slab in a much better manner and of tenderizing the slab to a considerable extent by the piercing action. Whatever type of food product slab is processed the important characteristics of the process are that heat is extracted from the slab from the major portion of its thickness at closely-spaced locations distributed over only one principal surface of the slab. Such heat is extracted sufficiently rapidly to promote substantially simultaneous freezing of all portions of the slab and such freezing should occur sufficiently quickly to prevent appreciable dehydration of the slab so as to avoid the occurrence of freezer burn.

For most efficient operation it is preferred that the freezer be of the continuously operating type and the freezer illustrated in the drawings includes a feed table or conveyor 1 from which food product slabs S are fed onto the conveyor 2 of the freezer. From this conveyor frozen food slabs F are discharged at the opposite end of the freezer onto a discharge conveyor 3 by which the frozen food slabs are transported to storage, packaging or shipping facilities. The entire freezing apparatus is enclosed in an insulated cabinet 4 which includes a hood 5 having inspection windows 6 in its opposite ends. This hood constitutes a removable portion of the cabinet which can be lifted off the freezer or swung to one side to afford access to the operating components of the apparatus housed in the cabinet.

From the feed end to the discharge end of the freezer the food product slabs are transported by the endless slat conveyor 2 which is composed of endless chains 7 carrying the individual slats 8 extending transversely of the chains on which the slabs rest. Such chains are supported by sprockets 9 spaced lengthwise of the freezer and the chains extend around the end guide sprockets 10 at the feed end of the freezer and 11 at the discharge end of the freezer. The shaft 12 carrying sprockets 11 is turned by a sprocket 13 driven by chain 14, sprocket 15 and 16, chain 17 and sprocket 18 of speed-reducing drive mechanism powered by an electric motor 19.

Driven in synchronism with movement of the slab-transporting endless conveyor 2 is a second endless conveyor 20 composed of chains 21 which support, guide and move slab piercing members in proximity to the food product slabs carried by the conveyor 2 so as to effect piercing of such slabs during their movement through the freezer. Such piercing operation is effected by a cluster of solid tines 33 carried by the conveyor 20 in positions for engaging the upper surfaces of the food product slabs S. Tines are defined as "one of a set of slender pointed projecting parts of an implement or a weapon." "Slender" means "small or narrow in circumference or width in proportion to the length or height" Such tines project outwardly from base plates 23 carried by lugs 24 secured to the longitudinally central portions of opposite edges of the base plate, which in turn are attached to a link of each chain 21.

The chains 21 are supported and guided by sprockets 25 and 26 at opposite ends of the orbit of such chains and adjacent to the supply and discharge ends of the freezer, respectively. Shaft 27 on which sprockets 26 are mounted is rotated by a sprocket 28, chain 29, sprocket 30 and gear 31 driven by a gear 32, shown in FIGURE 2, meshing with it, which in turn is driven from motor 19 by sprocket 18, chain 17 and sprocket 16. Consequently, the slab-transporting conveyor 2 and the conveyor 20 carrying the piercing members are always driven in synchronism so that the upper stretch of the lower conveyor 2 and the lower stretch of the upper conveyor 20 will move conjointly along the path of movement of the food product slabs between the sprockets 9 supporting the intermediate portion of conveyor 2.

As shown best in FIGURES 4, 5 and 6, the slab-piercing members project downward from the lower stretch of conveyor 20 to locations closely adjacent to the upper stretch of the lower conveyor 2 between the supporting and guiding sprockets 9. Such relationship of the piercing members and the slab transporting surface will insure that the piercing members penetrate into the slab a distance equal to at least the major portion of the thickness of each slab and preferably almost entirely through the slab. Such disposition of the piercing members will insure contact with the principal portion of the thickness of the slab. By locating the piercing members close together and distributing them uniformly over the area of each slab, therefore, intimate contact with the entire body of the slab is insured. As shown in FIGURES 4 to 8, 10, 12 and 13, adjacent tines are of a width next to the base plate 23 at least substantially as great as the spaces between the tines. As shown in FIGURES 14 and 16, the incisions made by the piercing members are of a size and arrangement such that the spacing between adjacent incisions is less than the greatest width of such an incision.

The purpose of such intimate contact between the piercing members and the slab is to enable heat to be extracted rapidly from the entire volume of the slab. It is therefore necessary that the piercing members be of material having good heat conductivity and also that the temperature of such members be maintained sufficiently low to produce a substantial temperature differential bebetween the temperature of the slab and the temperature of the piercing members. To maintain such a temperature differential it is, therefore, also necessary to be able to dissipate quickly from the piercing members heat extracted from the slabs. For this purpose an effective heat-radiating means is associated with the piercing members.

In FIGURES 4, 5, 6, 8 and 9 the piercing tines 33 are illustrated as arranged in a symmetrical cluster including rows extending parallel to the direction of conveyor movement and rows extending transversely of the direction of conveyor movement. Each tine has a long double-bevel sharpened tip, as shown best in FIGURE 9, the planes of the bevels preferably being parallel to the direction of movement of the conveyors so that the edge formed by the intersection of the bevels also extends parallel to the direction of movement of the conveyors. As shown best in FIGURES 6 and 9, the spacing between the rows of tines, both parallel to the direction of movement of the conveyors and transversely of the direction of such movement, is approximately equal to the width of the tines in the same direction.

The tines 33 are carried by the base plates 23 and may be formed integral with such base plates by the transverse and longitudinal slots between the rows of tines being milled. Whether or not the tines are integral with the base plates, both the tines and the base plates should be of material having good heat conductivity, such as aluminum, so that heat absorbed by the tines will be conducted readily to the base plate. From such base plate heat can be transferred to a cluster of heat-radiating projections 34 on the opposite sides of the base plates which are the inner sides with respect to the orbit of the conveyor around which the base plates 23 move. Again, in order to provide for effective heat conduction from the base plates 23 to the radiator projections 34, it is important that such radiators be of good heat-conducting material and that there be an effective connection between the base plates and the radiators.

As in the case of the piercing members, an effective construction is to make the radiator projections integral with the base plates 23. In the construction shown in FIGURES 3 to 6, 8 and 9, the projections are in the form of plate elements 34 projecting inward from the bases 23 in parallel relationship. As shown in FIGURES 4, 5 and 6, it is preferred that each of the radiator plate elements be in registry with a row of tines 33 lengthwise of the tines and that the thickness of the plate elements be approximately equal to the corresponding thickness of the tines and to the width of the spaces between the plate elements and the tines. The lengths of such plate elements extend transversely of the direction of movement of the conveyors and such plate elements project from the base plate a distance a plurality of times as great as the thickness of the radiators with the exception of the two radiator plate elements adjacent to the leading edge and the trailing edge of each base plate. Such plate elements are considerably shorter so as to avoid interference between them during movement of the piercing conveyor around the supporting and guiding sprockets 25 and 26.

Instead of the radiators being a cluster of plate elements 34, as shown in FIGURES 8 and 9, such radiators can be formed as a cluster of posts, as shown in FIGURES 10 to 13 inclusive. In FIGURES 10 and 11 the radiator posts 34a are substantially square cross section and are arranged in rows extending parallel to the direction of movement of the conveyors and in rows extending transversely of the direction of movement of the conveyors like the tines at the opposite side of each base plate 23. Preferably each radiator post is aligned transversely of its base plate with a tine 33a projecting from the opposite side of the base plate. By arranging the tines and radiator posts in registry lengthwise of the tines in this manner, heat can be conducted most directly from a heat-extracting tine to a heat-radiating post.

In the piercing means construction shown in FIGURES 12 and 13, the radiator posts 34b again are preferably arranged in rows both parallel to the direction of travel of the conveyors 2 and 20 and transversely of such direction of travel. In this instance, however, the posts are of cylindrical shape. Also the tines 33b of FIGURES 12 and 13 are of cylindrical shape. The cross-sectional shape of the posts and tines has a considerable influence on the procedure for manufacturing this structure. The radiator elements 34a and tines 33a of square or rectangular cross section can be manufactured most readily integral with the base plate 23 by milling intersecting grooves in a solid block of metal. The radiator posts 34b and tines 33b of circular cross section shown in FIGURES 12 and 13, however, can be manufactured most readily by forming cylindrical combination radiator-and-tine units, drilling holes in a base plate 23 and pressing the radiator-tine units into the drilled holes of the base plate with a press fit. A similar manufacturing technique could be used for making the tine-and-radiator units shown in FIGURES 10 and 11, but in that case it would be necessary to mill or stamp or broach square or rectangular apertures in the base plate 23 into which combination radiator-and-tine elements could be pressed.

Not only can the radiators and tines be of different shapes, as discussed above, but the tips of the tines can be sharpened differently. While, as has been discussed, the tips of the tines 33 shown in FIGURES 8 and 9 are sharpened by forming the tine tips with a long double bevel, the tips of the tines shown in FIGURES 10 and 11 are sharpened on only one side with a long single bevel so as to form a chisel edge. The tips of tines 33b shown in FIGURES 12 and 13 are sharpened to points by forming on them conical tips. Correspondingly, it will be understood that the tips of square tines could be sharpened to a point by making them pyramidal. Alternatively, the tines of circular cross section could be sharpened simply by a single bevel, as shown in FIGURES 10 and 11, or a double bevel, as shown in FIGURES 8 and 9, or the square or rectangular tines could be sharpened to a conical point.

Whatever the shape of the piercing points provided on the tines, it is desirable for the tines to be eased gradually into piercing relationship with the food product slabs prior to the freezing operation and eased out of such slabs when the freezing operation has been completed. A combined slab-transporting conveyor arrangement and tine-carrying conveyor arrangement shown in FIGURE 1 will accomplish this purpose. The relationship of the upper stretch of lower conveyor 2 and the lower stretch of the upper conveyor 20 is such that the feed ends of such conveyor stretches converge in the direction of conveyor movement and the discharge ends of such conveyor stretches diverge in the direction of conveyor movement. Such relationship is accomplished by providing an upwardly inclined portion in the direction of conveyor movement at the entering end of the slab-transporting conveyor 2 to the chain-supporting sprockets 9 adjacent to the feed end of the conveyors and a section of the upper stretch of conveyor 2 inclined down- wardly in the direction of conveyor movement at the discharge end of the conveyor beyond the guide sprocket 9 adjacent to the discharge end of the conveyor.

Figure 3:
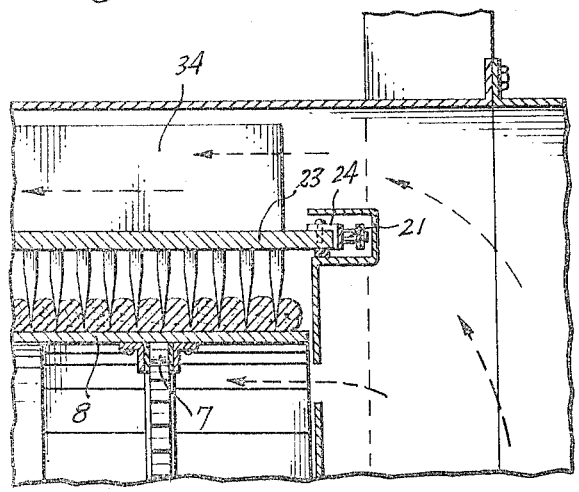
FIGURE 3 is an enlarged detail vertical transverse section through a portion of the freezer.

As food product slabs are moved upward in the direction of the arrow shown at the right of FIGURE 1 toward the piercing conveyor 20, therefore, the tines 33 will be pressed progressively farther into the slabs until they are in the positions shown in FIGURE 3 and at the right of FIGURE 6 in which the tips of the tines have penetrated nearly through the slabs. The degree of penetration of the tine tips can be altered to any extent desired by varying the spacing between the parallel portions of the upper stretch of the lower conveyor and the lower stretch of the upper conveyor. Adjustment of this spacing can be accomplished by mounting the sprockets 9 supporting the chains 7 of the lower conveyor so that they can be shifted elevationally. The axles 35 of such sprockets are shown in FIGURES 1 and 2 as being mounted in journal blocks 36 which are slidably engaged between vertical ways 37 formed as flanges of channel iron uprights. The webs 38 of such uprights are slotted vertically to receive the axles and the height of the blocks 36 can be altered by proper rotative adjustment of block-supporting setscrews 39.

When the position of the upper stretch of the lower conveyor 2 between sprockets 9 has been adjusted to the position desired, the tension of the chains 7 can be adjusted by a chain-tightener mechanism without interfering with the drive arrangement for axle 12. The axle 40 carrying the sprockets 10 at the feed end of the conveyor 2 can be mounted in sliding journal blocks 41 mounted in ways 42. The positions of these blocks in their ways can be adjusted by movement of the set-screw 43 shown at the right of FIGURE 1. Movement of the journal blocks 41 to the left, as seen in FIGURE 1, will provide slack in the conveyor chains 7 to enable the sprockets 9 to be raised. Conversely, if these sprockets are lowered, the setscrews 43 can be turned to slide blocks 41 to the right for tightening the chains 7 again to the desired degree.

During travel of the upper stretch of conveyor 2 and the lower stretch of conveyor 20 conjointly between the locations of the two sprockets 9 with the tines 33 piercing the food product slabs S, such slabs will be frozen. Appropriate refrigeration equipment will be provided either in the insulated cabinet 4 or in a location to cool air supplied from such refrigeration mechanism to the insulated cabinet. The cold air, preferably at a temperature of $-10$ degrees Fahrenheit to $-50$ degrees Fahrenheit, depending upon the type of product being processed, the volume of such product and the thickness of the slabs, will be circulated in heat exchange relationship to the slats 8 of the conveyor 2 and to the radiator elements associated with the tines. Fans shown in FIGURES 1 and 2 circulate the cold air from a compartment within a housing 46 beneath the conveyors upwardly within such housing and along paths extending transversely of the direction of movement of the conveyors.

It is preferred that heat be extracted from both surfaces of the food product slabs simultaneously. Consequently, it is desirable for the lower sides of such slabs to be in good heat-transfer relationship to the slats 8 of the conveyor 2 and for such slats to be of material having good thermal conductivity, such as aluminum. When cold air is blown beneath the underside of the upper stretch of this conveyor, therefore, as indicated in FIGURE 2, such cold air will extract heat from the lower surface of the slab. The tines penetrating the upper side of the slab will extract heat from its interior. Air cannot pass between the base plates 23 and the upper sides of the slabs to remove heat from such upper sides. The space between the upper sides of the slabs and the base plates blocked from air passage is shown best in FIGURE 6. An additional current of air will pass between the upper side of the lower stretch of base plates 23 and the upper wall of the housing 46. Such air current will flow through the passages between the radiator members so that such members can radiate to that air heat extracted from the central portions of the slabs by the tines and conducted from them to the radiators.

After the slabs S have become frozen as they reach the positions shown in FIGURES 4, 5 and 6, it is necessary to strip the frozen slab F from the tines. For this purpose a stripping fork 47 has prongs 48 arranged with their lengths extending generally parallel to the direction of movement of the cooperating stretches of the conveyors 2 and 20 and interdigitated with the tines 33, as shown best in FIGURE 7. Such prongs are located at the discharge side of the left sprockets 9 where the adjacent stretches of the conveyors diverge. The tips of such prongs lie close to the base plates 23 and such prongs are inclined relative to such base plates so that the tines are, in effect, withdrawn progressively from between the prongs.

As the leading edges of the slabs pass beyond the left sprocket 9, as seen in FIGURES 1 and 6, the frozen slab will cling to the tines until such leading edge engages the prongs 48 as indicated in FIGURE 4. During further movement of the conveyors the leading edge of the slab will slide along the inclined prongs, first to the position of FIGURE 5 and then to the position of FIGURE 6. By such movement, the slab F which is frozen solid will be wedged downward off the tines until it drops again onto the slats 8 of the descending discharge portion of the conveyor 2. Because the slab has been frozen while the tines are embedded in the slab, such slab will retain the impression of the tine arrangement after it has been stripped from the tines by the fork 47 so that it will appear as shown in FIGURES 14 and 16.

As has been discussed previously, because the heat has been extracted simultaneously and rapidly from both the interior and exterior of the slabs, dehydration will be minimized, freezer burn will be avoided and the natural reddish color of the slab if it is a meat product will be preserved. Actually, during the freezing process meat juices may migrate from the interior of the slab to the surfaces to a greater or lesser extent which, in some instances, will heighten the color of the surfaces to some extent if they have become somewhat grayish or darkened as a result of standing prior to being fed to the freezer.

Piercing of meat product slabs has the additional beneficial effect on the slab illustrated by a comparison of FIGURES 15 and 16. In the first place the thickness $t$ of the unfrozen slab S is somewhat less than the thickness T of the frozen slab F because of the displacement of meat from the incisions which is reflected in an overall increase in thickness of the slab. Such thickness will be retained in the frozen slab F because of the rigidity effected by freezing. The additional benefit of the incised frozen slab F is the result of the ability of the incisions to retain juices from the meat during cooking. In cooking meat which has been frozen, it is the preferred practice to place the frozen slab of meat in a frying pan or in a broiler. As the meat thaws during cooking, juices will be liberated and those which exude to the upper surface of a slab S as shown in FIGURE 15 will largely run off over the edges of the slab and be lost. Juices liberated from the slab F of FIGURE 16 during cooking, however, will accumulate in the incisions and be retained for reabsorption into the meat during the later part of the cooking operation after the slab has been thawed completely so that the cooked product resulting from the slab F processed in accordance with the present invention will be much juicier than a slab of meat frozen in a conventional manner.

I claim as my invention:

1. A freezer for food product slabs comprising transport conveyor means operable to transport a food product slab through the freezer, heat-extraction conveyor means having a stretch extending alongside an adjacent stretch of said transport conveyor means and including piercing means in the form of successive clusters of tines projecting from one side of said heat-extraction conveyor means toward said transport conveyor means for piercing, respectively, successive food product slabs between said adjacent conveyor means stretches to extract heat from the interior of such food product slabs and heat-radiating projections projecting from the opposite side of said heat-extraction conveyor means, operable to receive heat from said piercing means tines and to dissipate such heat, and drive means for said transport conveyor means and said heat-extraction conveyor means to move said adjacent conveyor means stretches conjointly in the same direction with said piercing means penetrating a food product slab transported by said transport conveyor means.

2. The freezer defined in claim 1, and means supporting the adjacent stretches of the two conveyor means to adjust the spacing between the adjacent stretches thereof for varying the depth of penetration of the tines into the food product slabs.

3. The freezer defined in claim 1, in which each tine is in registry lengthwise of such tine with a radiator means projection.

4. The freezer defined in claim 1, and fork-stripping means including prongs extending generally lengthwise of the direction of movement of the adjacent stretches of the two conveyor means and interdigitated with the tines at an angle to the direction of movement of the tips of the tines for stripping frozen food product slabs from the tines by relative movement of the fork-stripping means and the heat-extraction conveyor means.

5. In a freezer for food product slabs, a cluster of solid heat-extracting tines of good heat-conducting material having their ends sharpened to form food product piercing tips disposed in substantially parallel relationship for penetrating a food product slab to extract heat from the interior thereof, a base plate supporting said cluster of piercing tines projecting from one side thereof, adjacent tines being of a width next to said base plate at least substantially as great as the spaces between such tines, and a cluster of heat-radiating projections of good heat-conducting material projecting from the side of said base plate opposite said piercing tines in heat-conducting relationship to said tines and operable to dissipate heat from said tines while said tines are penetrating a food product slab.

6. In a freezer for food product slabs, a cluster of solid heat-extracting tines of good heat-conducting material having their ends sharpened to form food product piercing tips disposed in substantially parallel relationship for penetrating a food product slab to extract heat from the interior thereof, a base plate of good heat-conducting material supporting said cluster of piercing tines projecting from one side thereof, and a cluster of heat-radiating projections of good heat-conducting material projecting from the side of said base plate opposite said piercing tines in heat-conducting relationship to said tines and operable to dissipate heat from said tines while said tines are penetrating a food product slab, said heat-extracting tines and said heat-radiating projections being formed integral with opposite sides of said base plate, respectively.

7. The process of freezing food product slabs which comprises heat-conductively piercing a food product slab at closely-spaced locations distributed over substantially one entire surface of the slab and thereby conductively extracting heat through the walls of the incisions from the interior thereof rapidly and substantially uniformly from the entire slab, which heat is conducted to heat-radiating means, conveying such food product slabs while being thus pierced through a refrigerated space for radiation of such extracted heat from the heat-radiating means into the refrigerated space and freezing of such food product, and terminating such heat-conductive piercing during such conveying, leaving unfilled pierced cavities in the frozen food product open at the surface of such food product.

References Cited by the Examiner

UNITED STATES PATENTS

| | | | |
|---|---|---|---|
| 1,561,898 | 11/1925 | Antisell | 165—179 X |
| 1,939,334 | 12/1933 | Burke | 62—341 |
| 2,221,220 | 11/1940 | Pack | 62—380 X |
| 2,507,862 | 5/1950 | Mead. | |
| 2,835,480 | 5/1958 | Perey | 62—62 X |
| 2,859,685 | 11/1958 | Alexander | 91—419 |
| 3,006,767 | 10/1961 | Huckabee | 99—194 X |

FOREIGN PATENTS

| | | |
|---|---|---|
| 824,919 | 1/1939 | France. |
| 1,260,912 | 4/1961 | France. |
| 546,876 | 8/1942 | Great Britain. |

MEYER PERLIN, *Primary Examiner.*

ROBERT A. O'LEARY, *Examiner.*

W. E. WAYNER, *Assistant Examiner.*